US007953759B2

(12) United States Patent
Grossman et al.

(10) Patent No.: US 7,953,759 B2
(45) Date of Patent: May 31, 2011

(54) SIMPLIFYING APPLICATION ACCESS TO SCHEMATIZED CONTACT DATA

(75) Inventors: Joel K. Grossman, Seattle, WA (US); Vivien Park, Seattle, WA (US); Oliver G. Fisher, Ottawa (CA); Cornelis K. van Dok, Bellevue, WA (US); Joseph J. Brychell, III, Kirkland, WA (US); Melissa W. Dunn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/780,496

(22) Filed: Feb. 17, 2004

(65) Prior Publication Data

US 2005/0182741 A1 Aug. 18, 2005

(51) Int. Cl.
*G06F 17/30* (2006.01)
*G06F 7/00* (2006.01)
*G06F 17/00* (2006.01)

(52) U.S. Cl. ......... 707/802; 707/756; 707/781; 715/249
(58) Field of Classification Search .......... 707/1, 999.1, 707/756, 781, 802; 715/523, 522, 249
See application file for complete search history.

(56) References Cited

U.S. PATENT DOCUMENTS

| | | | |
|---|---|---|---|
| 5,214,756 A | 5/1993 | Franklin | |
| 5,640,565 A | 6/1997 | Dickinson | 395/712 |
| 5,659,788 A | 8/1997 | Someya | |
| 5,737,726 A | 4/1998 | Cameron | 705/7 |
| 5,767,897 A | 6/1998 | Howell | |
| 5,870,744 A | 2/1999 | Sprague | |
| 5,873,108 A | 2/1999 | Goyal | 707/507 |
| 5,896,321 A | 4/1999 | Miller | |
| 5,913,032 A | 6/1999 | Schwartz | |
| 5,923,848 A | 7/1999 | Goodhand | 395/200.49 |
| 5,950,193 A | 9/1999 | Kulkarni | 707/3 |
| 5,959,629 A | 9/1999 | Masui | |
| 5,999,208 A | 12/1999 | McNerney | |

(Continued)

FOREIGN PATENT DOCUMENTS

JP 9-046335 2/1997

(Continued)

OTHER PUBLICATIONS

Hibbert, Chris, "Visual Flex and XML", downloaded from www.dataaccess.com/whitepapers/xml/XMLWP.htm, dated by Wayback Machine as: May 2, 2001, pp. 1-25.*

(Continued)

*Primary Examiner* — Robert Stevens
(74) *Attorney, Agent, or Firm* — Workman Nydegger (57) ABSTRACT

The present invention is directed to utilizing contact data controls to simplify access to schematized contact data. Contact data controls abstract the formatting of schematized contact data from applications. In some embodiments, applications that lack the configuration to natively access schematized contact data (e.g., lack the functionality to convert between schematized and non-schematized data or are not authorized) forward requests to access schematized contact data to an external contact data control. In other embodiments, applications that lack the configuration to natively access schematized contact data forward non-schematized data, which is to be used to update schematized contact data, to an external contact data control. External contact data controls appropriately interact with the schematized data and can provide user-interface such that an application designer need not have extensive knowledge of contact schemas associated with the schematized contact data.

24 Claims, 4 Drawing Sheets

U.S. PATENT DOCUMENTS

| | | | |
|---|---|---|---|
| 6,008,799 A | 12/1999 | Van Kleeck | |
| 6,014,135 A | 1/2000 | Fernandes | |
| 6,026,396 A | 2/2000 | Hall | |
| 6,065,012 A | 5/2000 | Balsara | |
| 6,208,339 B1 | 3/2001 | Atlas | |
| 6,209,005 B1 | 3/2001 | Harker | 707/501 |
| 6,212,534 B1 | 4/2001 | Lo | |
| 6,216,122 B1 | 4/2001 | Elson | |
| 6,247,043 B1* | 6/2001 | Bates et al. | 709/200 |
| 6,269,369 B1 | 7/2001 | Robertson | 709/1 |
| 6,339,826 B2 | 1/2002 | Hayes | |
| 6,411,961 B1 | 6/2002 | Chen | |
| 6,434,564 B2 | 8/2002 | Ebert | 707/100 |
| 6,460,074 B1 | 10/2002 | Fishkin | |
| 6,539,379 B1 | 3/2003 | Vora | 707/6 |
| 6,557,004 B1 | 4/2003 | Ben-Shachar et al. | 707/102 |
| 6,564,213 B1 | 5/2003 | Ortega | |
| 6,571,235 B1 | 5/2003 | Marpe | |
| 6,581,059 B1 | 6/2003 | Barrett | |
| 6,581,062 B1* | 6/2003 | Draper et al. | 707/100 |
| 6,609,108 B1* | 8/2003 | Pulliam et al. | 705/27 |
| 6,643,661 B2 | 11/2003 | Polizzi | |
| 6,661,434 B1 | 12/2003 | MacPhail | |
| 6,668,281 B1 | 12/2003 | Ayyadurai | 709/223 |
| 6,678,685 B2* | 1/2004 | McGill et al. | 707/10 |
| 6,699,125 B2 | 3/2004 | Kirmse | |
| 6,701,348 B2 | 3/2004 | Sommerer | |
| 6,718,366 B2 | 4/2004 | Beck et al. | 709/203 |
| 6,753,889 B1 | 6/2004 | Najmi | |
| 6,781,608 B1 | 8/2004 | Crawford | |
| 6,791,583 B2 | 9/2004 | Tang | |
| 6,820,075 B2 | 11/2004 | Shanahan | |
| 6,820,204 B1 | 11/2004 | Desai | |
| 6,828,988 B2 | 12/2004 | Hudson | |
| 6,829,607 B1 | 12/2004 | Tafoya | |
| 6,832,263 B2 | 12/2004 | Polizzi | |
| 6,839,680 B1 | 1/2005 | Liu | |
| 6,845,370 B2 | 1/2005 | Burkey | |
| 6,859,823 B1 | 2/2005 | Nishihara | |
| 6,870,921 B1 | 3/2005 | Elsey | |
| 6,871,140 B1 | 3/2005 | Florance | |
| 6,883,000 B1 | 4/2005 | Gropper | |
| 6,895,388 B1* | 5/2005 | Smith | 705/26 |
| 6,907,580 B2 | 6/2005 | Michelman | |
| 6,947,929 B2 | 9/2005 | Bruce | |
| 6,959,340 B1 | 10/2005 | Najmi | |
| 6,983,310 B2 | 1/2006 | Rouse | 709/206 |
| 6,985,924 B2 | 1/2006 | Schwartz | 709/206 |
| 6,988,128 B1 | 1/2006 | Alexander | |
| 6,990,495 B1 | 1/2006 | Grason | 707/10 |
| 6,993,712 B2 | 1/2006 | Ramachandran | |
| 7,007,149 B2 | 2/2006 | Chung | |
| 7,010,572 B1 | 3/2006 | Benjamin | 709/206 |
| 7,010,599 B2* | 3/2006 | Shrinivasan et al. | 709/225 |
| 7,010,616 B2 | 3/2006 | Carlson | |
| 7,043,471 B2 | 5/2006 | Cheung | |
| 7,068,768 B2 | 6/2006 | Barnes | |
| 7,076,498 B2* | 7/2006 | Banerjee et al. | 707/102 |
| 7,096,232 B2 | 8/2006 | Doss | |
| 7,113,941 B2 | 9/2006 | Arend | |
| 7,143,190 B2 | 11/2006 | Christensen | |
| 7,146,570 B2 | 12/2006 | Yeh | 715/758 |
| 7,159,207 B2* | 1/2007 | Tang et al. | 717/109 |
| 7,162,474 B1 | 1/2007 | Harker | |
| 7,185,271 B2 | 2/2007 | Lee et al. | |
| 7,191,210 B2 | 3/2007 | Grossman | |
| 7,209,951 B2 | 4/2007 | Goldberg | |
| 7,240,298 B2 | 7/2007 | Grossman | |
| 7,287,053 B2 | 10/2007 | Bodin | |
| 2001/0005848 A1* | 6/2001 | Haverstock et al. | 707/1 |
| 2002/0029254 A1* | 3/2002 | Davis et al. | 709/217 |
| 2002/0035562 A1* | 3/2002 | Roller et al. | 707/6 |
| 2002/0073207 A1 | 6/2002 | Widger | 709/206 |
| 2002/0107914 A1 | 8/2002 | Charisius | |
| 2002/0120864 A1 | 8/2002 | Wu | |
| 2002/0143961 A1 | 10/2002 | Siegel | |
| 2002/0156895 A1* | 10/2002 | Brown | 709/226 |
| 2002/0169841 A1* | 11/2002 | Carlson et al. | 709/206 |
| 2002/0174237 A1* | 11/2002 | Shrinivasan et al. | 709/229 |
| 2002/0186257 A1 | 12/2002 | Cadiz | |
| 2003/0041065 A1* | 2/2003 | Lucovsky et al. | 707/10 |
| 2003/0041076 A1* | 2/2003 | Lucovsky et al. | 707/500 |
| 2003/0050911 A1* | 3/2003 | Lucovsky et al. | 707/1 |
| 2003/0069874 A1 | 4/2003 | Hertzog | 707/1 |
| 2003/0126137 A1 | 7/2003 | McFadden | |
| 2003/0131073 A1* | 7/2003 | Lucovsky et al. | 709/219 |
| 2003/0158855 A1 | 8/2003 | Farnham | |
| 2003/0164862 A1 | 9/2003 | Cadiz | 715/838 |
| 2003/0208465 A1 | 11/2003 | Yurko | |
| 2003/0210265 A1 | 11/2003 | Haimberg | |
| 2004/0083453 A1* | 4/2004 | Knight et al. | 717/113 |
| 2004/0093334 A1 | 5/2004 | Scherer | |
| 2004/0103364 A1 | 5/2004 | Dornback | |
| 2004/0107283 A1* | 6/2004 | Paddon | 709/229 |
| 2004/0117322 A1 | 6/2004 | Bjorksten | |
| 2004/0119732 A1 | 6/2004 | Grossman | |
| 2004/0119758 A1 | 6/2004 | Grossman | |
| 2004/0119760 A1 | 6/2004 | Grossman | |
| 2004/0122683 A1 | 6/2004 | Grossman | |
| 2004/0139025 A1 | 7/2004 | Coleman | |
| 2004/0177082 A1* | 9/2004 | Nitta et al. | 707/100 |
| 2004/0210844 A1 | 10/2004 | Pettinati | |
| 2004/0221309 A1 | 11/2004 | Zaner | |
| 2004/0235520 A1 | 11/2004 | Cadiz | |
| 2004/0236792 A1 | 11/2004 | Celik | |
| 2004/0243935 A1* | 12/2004 | Abramovitch | 715/523 |
| 2004/0254939 A1* | 12/2004 | Dettinger et al. | 707/100 |
| 2004/0260948 A1 | 12/2004 | Miyata | |
| 2005/0002510 A1 | 1/2005 | Elsey | |
| 2005/0004874 A1 | 1/2005 | Gilmour | |
| 2005/0015439 A1* | 1/2005 | Balaji et al. | 709/203 |
| 2005/0080805 A1* | 4/2005 | Haeberle et al. | 707/102 |
| 2005/0091072 A1 | 4/2005 | Dunn | |
| 2005/0114318 A1* | 5/2005 | Dettinger et al. | 707/3 |
| 2005/0114329 A1* | 5/2005 | Dettinger et al. | 707/5 |
| 2005/0131888 A1 | 6/2005 | Tafoya | |
| 2005/0182741 A1 | 8/2005 | Grossman | |
| 2005/0262208 A1 | 11/2005 | Haviv | 709/206 |
| 2005/0283468 A1 | 12/2005 | Kamvar | |
| 2006/0010104 A1 | 1/2006 | Pettinati | |
| 2006/0041545 A1 | 2/2006 | Heidloff | |
| 2006/0053384 A1 | 3/2006 | La Fetra | |
| 2006/0064645 A1 | 3/2006 | Neven | |
| 2006/0174002 A1* | 8/2006 | Shrinivasan et al. | 709/225 |
| 2006/0253787 A1 | 11/2006 | Fogg | 379/88.13 |
| 2006/0277213 A1 | 12/2006 | Robertson | 707/10 |

FOREIGN PATENT DOCUMENTS

| | | |
|---|---|---|
| JP | 9-503088 | 3/1997 |
| JP | 2000-315234 | 11/2000 |
| JP | 2002-517863 | 6/2002 |
| JP | 2002-312404 | 10/2002 |
| WO | WO 95/23371 | 8/1995 |
| WO | WO 99/64970 | 12/1999 |
| WO | WO 01-80190 | 10/2001 |
| WO | WO 02/073454 A2 * | 9/2002 |
| WO | WO 2005013079 | 10/2005 |

OTHER PUBLICATIONS

Dogac, Asuman, et al., "An ebXML Infrastructure Implementation through UDDI Registries and RosettaNet PIPs", ACM SIGMOD 2002, Madison, WI, Jun. 4-6, 2002, pp. 512-523.*

Ren, Ligang, et al., "Data Synchronization in the Mobile Internet", The 7th Intl Conf on CSCW in Design, Sep. 25-27, 2002, pp. 95-98.*

Lee, Jinho, et al., "An Evaluation of the Incorporation of a Semantic Network Into a Multidimensional Retrieval Engine", CIKM '03, New Orleans, LA, Nov. 3-8, 2003, pp. 572-575.*

Su, Hong, et al., "Automating the Transformation of XML Documents", WIDM 2001, Atlanta, GA, Nov. 2001, pp. 68-75.*

McCabe, M. Catherine, et al., "On the Design and Evaluation of a Multi-Dimensional Approach to Onformation Retrieval", SIGIR 2000, Athens, Greece, Jul. 2000, pp. 363-365.*

Bussler, Christoph, et al., "A Conceptual Architecture for Semantic Web Enabled Services", SIGMOD Record, vol. 31, No. 4, Dec. 2002, pp. 24-29.*

Nejdl, Wolfgang, et al., "EDUTELLA: A P2P Networking Infrastructure Based on RDF", WWW 2002, Honolulu, HI, May 7-11, 2002, pp. 604-615.*
Bychkov, Yury, et al., "Interactive Migration of Legacy Databases to Net-Centric Technologies", Proceedings of the 8th Working Conference on Reverse Engineering, Oct. 2-5, 2001, pp. 328-334.*
Bakker, John-Luc, et al., "Next Generation Service Creation Using XML Scripting Languages", IEEE International Conference on Communications, vol. 4, Apr. 22 May 2, 2001, pp. 2001-2007.*
Kim, Sung Wan, et al., "Developing a Native Storage Structure for XML Repository System in Main Memory", 5th International Conference on High Speed Networks and Multimedia Communications, © 2002, pp. 96-100.*
Shui, William M., et al., "Application of XML Schema and Active Rules System in Management and Integration of Heterogeneous Biological Data", BIBE '03, Mar. 10-12, 2003, pp. 367-374.*
Banerjee, Sandeepan, et al., "Oracle8i—The XML Enabled Data Management System", 16th International Conference on Data Engineering, San Diego, CA, Feb. 29-Mar. 3, 2000, pp. 561-568.*
Haas, L. M., et al., "Transforming Heterogeneous Data with Database Middleware: Beyond Integration", Bulletin of the IEEE Computer Society Technical Committee on Data Engineering, © 1997, pp. 1-6.*
Nambiar, Ullas, et al., "Current Approaches to XML Management", IEEE Internet Computing, vol. 6, Issue 4, Jul./Aug. 2002, pp. 43-51.*
Lear, Anne C., et al., "XML Seen as Integral to Application Integration", IT Professional, vol. 1, Issue 5, Sep./Oct. 1999, pp. 12-16.*
Zhan, H. F., et al., "A Web-Based Collaborative Product Design Platform for Dispersed Network Manufacturing", Journal of Materials Processing, vol. 138, Issues 1-3, Jul. 20, 2003, pp. 600-604.*
Huynh, David, et al.,."Haystack: A Platform for Creating, Organizing and Visualizing Information Using RDF", Semantic Web Workshop (at WWW2002), Honolulu, HI, May 2002, pp. 1-11.*
Getting Results with Microsoft Office 97, Microsoft Corp., Redmond, WA, © 1997, pp. 28-31, 345-374 and 470-471.*
Padwick, Gordon, et al., Special Edition Using Microsoft Outlook 2000, Que Corp., Indianapolis, IN, May 1999, pp. 370-376, 382-386 and 392-396.*
Morrison, Michael, et al., XML Unleashed, SAMS Corp., Indianapolis, IN, Dec. 1999, pp. 26-37, 84-104 and 106-122.*
Anderson, T., *Change Your Outlook*, Developer Network Journal, No. 25, p. 50-1, Jul.-Aug. 2001.
Taylor, T.C., *Databases Save Time and Customers*, Sales & Marketing Management, vol. 142, No. 4, p. 105-7, Mar. 1990.
Kubota, K.; Masuno, H., *Multi-Media Software PI*, NEC Technical Journal, vol. 41, No. 13, p. 72-6, Nov. 1988.
Pettigrew, T., *ACT!—Automated Contact Tracking*, CA Magazine, vol. 95, No. 1022, p. 48-9, Sep. 1991.
Simaioforidis, A.; Karlgren, J.; Ereback, A., *Research and Advanced Technology for Digital Libraries, Second European Conference, ECDL '98. Proceedings*, p. 673-4, Sep. 21-23, 1998.
Heller, S.R., *Symantec ACT! 4.0 for Windows*, Journal of Chemical Information and Computer Sciences, vol. 38, No. 4, p. 772, Jul.-Aug. 1998.
Padwick, Feddema, Special Edition Using Microsoft Outlook 2000, Que, Ch. 9 'Managing Contacts', p. 1-17.
Padwick, Feddema, Special Edition Using Microsoft Outlook 2000, Que, Ch. 16 'Managing Your Computer Environment': Using Other Shortcuts in the Outlook Bar, p. 1-4.
Padwick, Feddema, Special Edition Using Microsoft Outlook 2000, Que, Ch. 18 'Finding and Organizing Outlook Items': Using the QuickFind Contact Tool, p. 1-4.
Padwick, Feddema, Special Edition Using Microsoft Outlook 2000, Que, Ch. 18 'Finding and Organizing Outlook Items': Organizing Outlook Items, p. 1-7.
Padwick, Feddema, Special Edition Using Microsoft Outlook 2000, Que, Ch. 22 'Creating and Using Rules', p. 1-5.
Padwick, Feddema, Special Edition Using Microsoft Outlook 2000, Que, Ch. 38 'Creating Views and Print Styles', p. 1-25.
Padwick, Feddema, Special Edition Using Microsoft Outlook 2000, Que, Ch. 41 'Creating and Using Custom Fields': Why Do You Need Custom Fields?, p. 1-14.
Padwick, Feddema, Special Edition Using Microsoft Outlook 2000, Que, Ch. 41 'Creating and Using Custom Fields': Creating a Simple Custom Field, p. 1-3.
Padwick, Feddema, Special Edition Using Microsoft Outlook 2000, Que, Appendix C 'Outlook's Files, Folders, Fields, and Registry Keys', p. 1.
Mohamed; "Marketcircle a recipient of the 2002 Apple Design Awards"; May 15, 2002; Marketcircle.
U.S. Appl. No. 11/760,392, filed Jun. 8, 2007, Grossman.
Office Action mailed Jun. 22, 2007 cited in U.S. Appl. No. 10/692,257.
Notice of Allowance mailed Mar. 27, 2007 cited in U.S. Appl. No. 10/324,251.
Office Action mailed Jun. 5, 2007, cited in U.S. Appl. No. 10/885,974.
Padwick, Feddema, Special Edition Using Microsoft Outlook 2000, Que, Appendix C 'Outlook's Files, Folders, Fields, and Registry Keys', p. 1.
Office Action mailed Aug. 3, 2007, cited in U.S. Appl. No. 10/324,243.
Notice of Allowance mailed Aug. 9, 2007, cited in U.S. Appl. No. 10/324,250.
Notice of Allowance mailed Jul. 3, 2007, cited in U.S. Appl. No. 10/324,746.
Notice of Allowance mailed Aug. 8, 2007, cited in U.S. Appl. No. 10/326,660.
Microsoft Computer Dictionary, 2002, Microsoft Press, 5th edition, p. 162.
Paul McFedries, Complete Idiot's Guide to Windows XP, Pub Date: Oct. 3, 2001. pp. 1-3.
Paul Thurrott's SuperSite for Windows: Internet Explorer 5.0 Reviewed. Duke Communications International, Inc. 2000. pp. 1-8.
Office Action dated Aug. 23, 2007 cited in U.S. Appl. No. 10/845,464.
Office Action dated Oct. 5, 2007 cited in U.S. Appl. No. 10/885,974.
Notice of Allowance dated Oct. 2, 2007 cited in U.S. Appl. No. 10/324,250.
Notice of Allowance dated Oct. 5, 2007 cited in U.S. Appl. No. 10/326,660.
By Gordon Padwick, Helen Feddma; ProQuest Information and Learning—"Special Edition Using Microsoft Outlook 2000"; Publisher; Que; Pub Date: May 12, 1999; "Safari Tech Books, Online", 1 page.
U.S. Appl. No. 10/324,746, Mail Date Jun. 6, 2006, Office Action, 24 pp.
U.S. Appl. No. 10/324,746, Mail Date Feb. 26, 2007, Office Action, 20 pp.
U.S. Appl. No. 10/324,746, Mail Date Sep. 7, 2007, Notice of Allowance, 45 pp.
U.S. Appl. No. 10/845,464, Mail Date Apr. 6, 2007, Office Action, 22 pp.
U.S. Appl. No. 10/845,464, Mail Date Jan. 28, 2008, Office Action, 29 pp.
U.S. Appl. No. 10/845,464, Mail Date May 19, 2008, Notice of Allowance, 51 pp.
U.S. Appl. No. 10/885,974, Mail Date Jun. 13, 2008, Notice of Allowance, 15 pp.
U.S. Appl. No. 10/692,257, Mail Date Nov. 16, 2007, Office Action, 29 pp.
U.S. Appl. No. 10/692,257, Mail Date Apr. 7, 2008, Office Action, 27 pp.
U.S. Appl. No. 10/324,250, Mail Date Apr. 5, 2006, Office Action, 22 pp.
U.S. Appl. No. 10/324,250, Mail Date Sep. 22, 2006, 17 pp, Office Action.
U.S. Appl. No. 10/324,250, Mail Date Feb. 7, 2007, Office Action, 36 pp.
U.S. Appl. No. 10/324,250, Mail Date Nov. 16, 2007, 10 pp, Notice of Allowance.
U.S. Appl. No. 10/324,251, Mail Date Apr. 14, 2006, Office Action, 25 pp.
U.S. Appl. No. 10/324,251, Mail Date Nov. 3, 2006, 19 pp, Office Action.

U.S. Appl. No. 10/324,243, Mail Date Jan. 22, 2007, Office Action, 31 pp.
U.S. Appl. No. 10/324,243, Mail Date Mar. 24, 2008, 60 pp, Office Action.
U.S. Appl. No. 10/324,246, Mail Date Apr. 3, 2006, Office Action, 27 pp.
U.S. Appl. No. 10/324,246, Mail Date Oct. 31, 2006, 31 pp, Office Action.
U.S. Appl. No. 10/324,246, Mail Date Mar. 21, 2007, Office Action, 14 pp.
U.S. Appl. No. 10/324,246, Mail Date Oct. 4, 2007, 20 pp, Notice of Allowance.
U.S. Appl. No. 10/324,246, Mail Date Dec. 13, 2007, Notice of Allowance, 7 pp.
U.S. Appl. No. 10/326,660, Mail Date Apr. 17, 2006, 21 pp, Office Action.
U.S. Appl. No. 10/326,660, Mail Date Oct. 6, 2006, Office Action, 18 pp.
U.S. Appl. No. 10/326,660, Mail Date Feb. 8, 2007, 17 pp, Office Action.
U.S. Appl. No. 10/326,660, Mail Date Nov. 16, 2007, Notice of Allowance, 9 pp.
U.S. Appl. No. 10/324,243, Mail Date Sep. 30, 2008, 42 pp, Office Action.
U.S. Appl. No. 10/692,257, Mail Date Oct. 27, 2008, Office Action, 38 pp.
U.S. Appl. No. 10/692,257, Mail Date Mar. 30, 2009, 57 pp, Notice of Allowance.
U.S. Appl. No. 10/324,243, Mail Date Jun. 10, 2009, Office Action, 41 pp.
U.S. Appl. No. 11/760,392, Mail Date Mar. 30, 2010, 54 pp, Office Action.
U.S. Appl. No. 12/195,214, Mail Date Jun. 10, 2010, Office Action, 80 pp.
U.S. Appl. No. 12/195,214, Mail Date Jul. 22, 2010, 27 pp, Notice of Allowance.
U.S. Appl. No. 11/760,392, Mail Date Aug. 19, 2010, Notice of Allowance, 18 pp.
U.S. Appl. No. 12/195,214, filed Aug. 20, 2008, Pettinati.
U.S. Appl. No. 12/885,706, filed Sep. 20, 2008, Pettinati.

* cited by examiner

Cancel Data
Name: John Doe
E-mail: jdoe@testcorp.com — 407
Add More Contact Data — 409
402

Fig. 4B

Cancel Data
Name: John Doe — 407
E-mail: jdoe@testcorp.com — 403
402
Add More Contact Data — 409

Fig. 4C

Cancel Data
Name: John Doe
E-mail: jdoe@testcorp.com — 407
Add More Contact Data — 411
E-Mail — 402
Phone
IM
Address

Fig. 4D

Cancel Data
Name: John Doe
E-mail: jdoe@testcorp.com — 407
johndoe@testorg.org — 408
Add More Contact Data — 409
402

Fig. 5

SIMPLIFYING APPLICATION ACCESS TO SCHEMATIZED CONTACT DATA

BACKGROUND OF THE INVENTION

1. The Field of the Invention

The present invention relates to accessing schematized contact data. More specifically, the present invention relates to utilizing contact data controls to simplify access to schematized contact data.

2. Background and Relevant Art

As the computer industry continues to develop new and efficient means for communicating with contacts are becoming a reality. It is now commonplace, for example, for people to use their personal computers to communicate via e-mail, facsimile, instant message (IM), telephony, video teleconference (VTC), and so forth. This development of enabled communication through computerized devices has greatly enhanced the need for applications to store the contact information that is required for enabling communication and corroboration between contacts.

Contact information is generally referred to herein as information that can be considered relevant for contacting, accessing, corresponding with or otherwise communicating with a contact. Contact information may include, for example, the names, aliases, telephone numbers, e-mail addresses, IM addresses, home addresses, and web addresses of a contact. Contact information can also refer to other types of information such as a real time status, location or disposition of a contact. For example, information indicating a contact is currently connected to a network or on a telephone line may also be broadly construed as contact information. Because there are so many different types of contact information, it can be difficult for anyone to remember all of the contact information that is associated with the various contacts that they communicate with. The difficulty in remembering contact information is even further magnified by the fact that different applications require different types of contact information and sometimes different formats of contact information.

Accordingly, many applications are configured to store this information so that users do not have to commit it to memory. For example, e-mail applications typically utilize directories that are configured for storing the e-mail addresses of contacts that can be e-mailed. Likewise, telephony applications typically utilize directories for storing telephone numbers of contacts that can be called telephonically. Other examples of applications that store contact information include time management applications, instant messaging applications, network gaming applications, business directory applications, VTC applications, and so forth.

In order for a user to obtain the contact information that will be used by a particular application, such as, for example, to initiate a communication or to fill out a form, a user can query a contact information directory that is associated with the application. Accessing a contact information directory, however, is somewhat undesirable because it can increase the total amount of time that is required of the user. Even when the contact information is already known, the delay in time it takes to manually enter the known contact information can also be undesirable.

Contact information directories are typically configured to store only limited amounts of relevant information. For example, some contact information directories are configured to store only contact information specifically required by a corresponding application (e.g., a contact information directory associated with a telephony application may be configured to only store the telephone numbers and not e-mail addresses). Limiting the amount of contact information in a contact information directory can reduce the complexity of a corresponding interface, resulting in efficient access to contact information that is relevant at a particular time. For example, a telephony interface can provide simple and efficient access to telephone numbers.

The use of contact directories also extends to devices that are not considered traditional computers. For example, many telephones, facsimile devices, and photocopying devices also include contact directories for storing contact information that may be used to perform a desired function such as initiating a telephone call, a facsimile transmission, or a telecopy transmission.

Despite the benefits provided by existing contact management systems, the large variety of specialized and disparate contact information directories that are associated with the various applications and devices can make it difficult for users to quickly access all of the available contact information that corresponds to a particular contact. This is particularly true when considering that some of the disparate contact management directories contain different contact information.

One reason disparate contact information directories are problematic is that use of disparate contact information directories can increase the difficulty of identifying all available means for communicating with a contact. That is, a user desiring to access contact information may be required to separately access a number of different contact information directories (through a number of different interfaces) to obtain all the desired contact information. For example, it may be necessary to access a telephone directory to obtain the home or cell telephone number for the contact, an e-mail directory to obtain a primary e-mail address for the contact, a business directory to obtain the business telephone number, and business e-mail address of the entity, and so forth.

Having disparate contact information directories can also be problematic for obtaining different types of contact information about different contacts. For example, it may be desirable to view the e-mail address of a first contact, the business telephone number of a second contact, and the cell telephone number of a third contact. If the desired contact data for each of the different entities is located in a different contact management system of different applications, then each application will have to be accessed to obtain the desired information, thereby requiring the undesirable expenditure of time and resources.

Searches and queries for specific contacts or contact information must also be performed separately through corresponding interfaces for accessing each of the various contact directories. It will be appreciated that this can be particularly problematic when a user has forgotten in which of the contact directories the contact information is stored.

To overcome some of these problems, some contact management systems are configured to redundantly store contact information that is not necessarily required for use by the corresponding application. For example, an e-mail directory may be configured to store the addresses, phone numbers and other information about the various contacts, even though this information is not required to enable e-mail communications.

The variety of directories and corresponding storage capabilities, however, can vary from one application to the next, thereby increasing the difficulty for users to know which of the contact information can be duplicated in each of the different directories. Furthermore, even when it is possible for portions of the contact information to be redundantly stored in each of the different contact directories, such redundant storage would represent undesirable and unnecessary expenditure of computing resources.

Yet another problem with redundantly storing contact information within existing contact directories is that it can be difficult to propagate changes to the contact information throughout all of the various contact directories that are storing the modified contact information. In particular, the separate storage of the contact information in each of the directories necessitates that the change to the contact information be entered into each of the directories. Otherwise, the contact information that is available will be inconsistent and possibly incorrect.

Another problem with existing contact management systems is that because they are so specialized, they fail to provide very extensive and rich search and view capabilities of the contact information. In particular, most contact management systems are relegated to providing only two-dimensional columns or lists of the stored data. Yet another problem with existing contact management systems is that they do not enable a user to view, create, and edit relationships between contacts. More particularly, existing systems do not enable a user to view the relationships existing between contacts or to create and edit these relationships.

Accordingly, some mechanisms for utilizing a common concept of a contact across a number of applications have been developed. Contacts are created and stored with corresponding contact information in such a way that they can be accessed and utilized from a single contact store. For example, contact information can be stored according to a common contact schema that is accessible to applications that store and retrieve the contact information. Applications can be heterogeneous applications that utilize different portions of the contact information or utilize the same contact information in a variety of different ways.

However, due at least in part to the sheer number of different data types and different data formats that may expressed in a common contact schema, it may be difficult for applications to access contact information according to the common contact schema. Further, application designers may have difficulty understanding a common contact schema and designing applications that insure compliance with the common contact schema during execution. Unfortunately, non-compliance with data types and/or data formats expressed in a common contact schema can make corresponding contact information unstorable or inaccessible or may even cause the centralized location to malfunction. Malfunction of the centralized location may prevent a number of other applications from accessing contact information. Accordingly, what would be advantageous are mechanisms for simplifying access to schematized contact information.

BRIEF SUMMARY OF THE INVENTION

The present invention is directed to methods, systems, and corresponding computer program products for utilizing contact data controls to simplify access to schematized contact data. A user-interface contact data control can provide an application with user-interface data that can be presented to a user. The application can access the user-interface data to present a user-interface to the user. In some embodiments, an application that lacks the configuration to natively access schematized contact data (e.g., due to an inability to translate contact data or due to not being authorized) receives a request to access schematized contact data. It may be that the request is received at a contact data control provided user-interface. The application forwards the request to a data interface contact data control that abstracts the formatting of the schematized contact data from the application.

The data interface contact data control receives the forwarded request and retrieves schematized contact data in response to the request. The data interface contact data control converts retrieved schematized contact data to corresponding non-schematized contact data such that the application can present contact data. The data interface contact data control sends the non-schematized contact data to the application. A user-interface data control can provide the application with user-interface data for presenting the non-schematized data to the user. The application presents the non-schematized contact data.

In other embodiments, an application that lacks the configuration to natively update schematized contact data receives non-schematized contact data (e.g., through a user-interface provided by a user-interface contact data control) that is to be used to update schematized contact data. The application forwards the non-schematized contact data to a data interface contact data control that abstracts the formatting of the schematized contact data from the application. The schematized contact data is updated based on the non-schematized contact data.

The data interface contact data control receives the non-schematized contact data and converts the non-schematized contact data to corresponding schematized contact data that conforms to a contact data schema. The data interface contact data control stores corresponding schematized contact data such that other applications can access the stored schematized contact data (e.g., in accordance with the contact data schema). It may be that a contact data control includes the functionality of both a user-interface contact data control and data interface contact data control.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to methods, systems, and corresponding computer program products for utilizing contact data controls to simplify access to schematized contact data.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "schema" is defined as an expression of a shared vocabulary that allows different components to process data according to the expressed shared vocabulary. A schema can define and describe a class of data using schema constructs (e.g., name/value pairs) of schema language. These schema constructs can be used to constrain and document the meaning, usage, and relationships of data types, elements and their content, attributes and their values, entities and their contents, and notations. A schema can be utilized to define virtually any data type including logical, binary, octal, decimal, hexadecimal, integer, floating-point, character, character string, user-defined data types, and combinations of these data types used to defined data structures. Some examples of user-defined data types are DateTime data types representing date and time data and EAddress data types representing electronic addresses data, such as, for example, telephone numbers, electronic mail address, instant message addresses, etc.

As defined herein, the term "contact" generally refers to any person, group, organization, business, or other type of identifiable entity. The term contact can also include or imply an interaction, connection, relationship or association, between two or more entities. As stored in a centralized data store, the contact can include one or more data structures having fields that define or otherwise include the contact data corresponding to a particular contact.

The term "contact data," as used herein, and which is defined above in more detail, generally includes information that corresponds to a contact and that may be considered relevant for identifying, contacting, accessing, corresponding or communicating with the contact. Contact data can also be defined as any information corresponding to a person. At certain times, herein, the term contact data and contact are used interchangeably, inasmuch as the term can be construed to broadly encompass the corresponding contact data. Contact data defined in accordance with a schema can be viewed as "schematized contact data".

In various embodiments described herein, interfaces are used to control association of and access to contacts and corresponding contact data. These interfaces can be created, modified and used through computer software components, such as, for example, computer-executable instructions or computing modules.

As described herein, a programming interface (or more simply, an interface) may be viewed as any mechanism, process, protocol for enabling one or more segment(s) of code to communicate with or access the functionality provided by one or more other segment(s) of code, such as, for example, to access contact data. Alternatively, a programming interface may be viewed as one or more mechanism(s), method(s), function call(s), module(s), object(s), etc., of a component of a system capable of communicative coupling to one or more mechanism(s), method(s), function call(s), module(s), etc., of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Accordingly, it will be appreciated that the embodiments of the invention can include special purpose and general-purpose computing devices including various computer software and hardware that can be used to enable the interfaces described herein. The embodiments within the scope of the present invention can also include computer-readable media for carrying or having the computer-executable instructions or data structures stored thereon that comprise the interfaces and the code for using and modifying them.

It will be appreciated that the computer-readable media can be any available media that can be accessed by a general purpose or special purpose computer, including, but not limited to mobile communications devices. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. The computer-executable instructions comprise, for example, instructions and data which cause a general purpose computer, special purpose computer, or special purpose processing device to perform a certain function or group of functions, such as the acts and steps described below.

When information is transferred or provided over a network or another communications connection (either hardwired, wireless, or a combination of hardwired or wireless) to a computer or mobile communications device, the computer/device properly views the connection as a computer-readable medium. Thus, any such connection is properly termed a computer-readable medium. Combinations of the above should also be included within the scope of computer-readable media.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, or other smart mobile devices. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
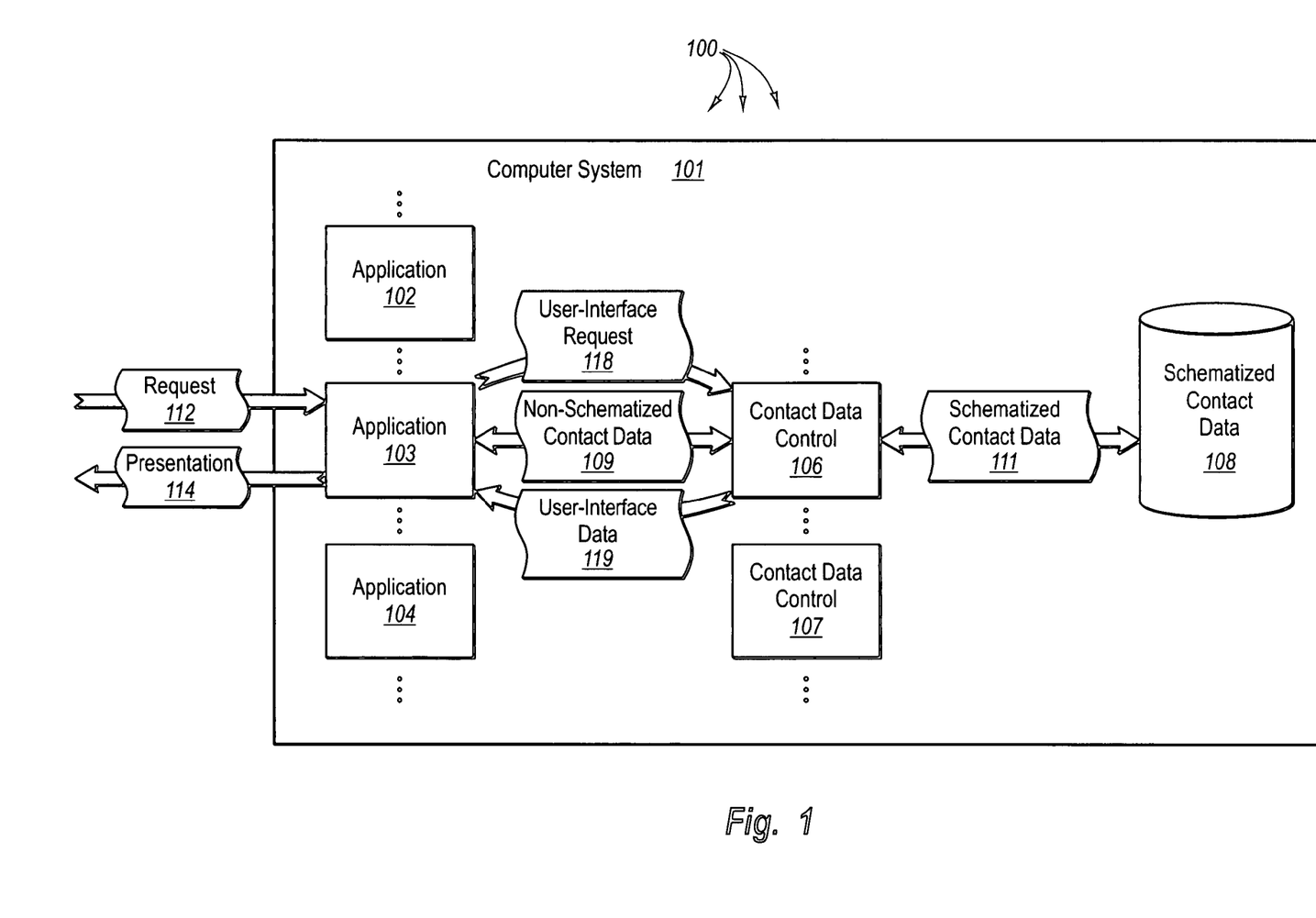
FIG. 1 illustrates an example of a computer architecture that facilitates simplified application access to schematized contact data.

FIG. 1 illustrates an example of a computer architecture 100 that facilitates simplified application access to schematized contact data. According to various methods and systems described herein, schematized contact data 108 can be stored in a centralized contact store. Although a centralized contact store can comprise a single computer readable media, it will be appreciated that in some embodiments, a centralized contact store actually comprises a plurality of computer-readable media, such that the centralized contact store is centralized only in theory and by way of functionality.

The centralized contact store preferably includes a complete definition of a contact, including all of the corresponding contact data that is required by the various applications that access the contact. In some embodiments, however, the definition of the contact is only partially complete, but still able to satisfy the information requirements of the various applications that access the contact data.

Within computing system 101, various applications 102, 103, 104 are shown that can attempt to access and/or update schematized contact data 108. Access or updates to schematized contact data 108 can occur directly or indirectly. Where direct communication can provide quick and unfettered access to the entire contact store, indirect communication such as through interfaces can provide more control and security. Various contact data controls 106, 107 are also shown. Contact data controls can abstract the formatting of schematized contact data 108 from applications. Accordingly, applications that lack the configuration to access or update schematized contact data 108 directly may instead access schematized contact data 108 indirectly by calling a contact data control.

It may be that an application lacks the configuration to natively access schematized contact data. For example, an application may lack the functionality to translate between schematized and non-schematized contact data. Further, it may also be that an application is not authorized to access schematized contact data (e.g., stored in schematized contact data 108). Accordingly, an application can invoke the functionality of a contact data control to provide translation between schematized and non-schematized contact data and/or to provide authorization to access schematized contact data.

Contact data controls can implement a wide variety of functionality. Some data controls provide user-interface data that can be accessed by an application to present a user-interface (hereinafter referred to as "user-interface contact data controls"). Other data controls can access schematized contact data and/or translate between schematized and non-schematized contact data (hereinafter referred to as "data interface contact data controls"). Yet other data controls can provide combined functionality of both a user-interface contact data control and a data interface contact data control (hereinafter referred to as "combined contact data controls").

It will be appreciated that the illustrated applications 102, 103, 104, contact data controls 106 and 107, and schematized contact data 108 can be hosted by the same computing device, or by one or more remote computing devices. Whether hosted by the same or different computing devices, contact data controls can be external to an application that calls the contact data control. Contact data controls can have appropriate APIs for interfacing with calling applications.

As described herein, the applications 102, 103, 104 may attempt access or update schematized contact data 108 (either directly or indirectly) for various reasons, such as to provide, obtain, modify, or otherwise utilize contact data. The applications 102, 103, 104 can include any type of application, including, but not limited to e-mail applications, telephone and telephony applications, time management applications, instant messaging applications, gaming applications, business directory applications, VTC applications, RTC applications, instant messaging applications, facsimile applications, and so forth. Thus, it may be that contact data controls provide portions of the functionality of these and other applications.

Following are some examples of the functionality that can be implemented in a contact data control. For example, a contact data control can cause an application not to present schematized data fields with NULL values. For example, if schematized contact data representing a contact has six fields formatted for storing telephone numbers but only three of the fields contain telephone numbers, a contact data control may suppress the three empty fields (e.g., represented by a NULL value) from being presented at an application. Accordingly, the contact control data presented at an application can be simplified.

A contact data control can offer an actionable editing user-interface. For example, a contact data control can associate presented and editable contact data with one or more verbs. Verbs can be selected (e.g., in response to user-input) from the actionable editing user-interface to perform an action. For example, selecting a field containing a telephone number can cause a dialer to dial the telephone number, selecting a field containing an e-mail address can cause an e-mail program to execute, selecting a field containing a birth date can cause a birthday card to be sent, etc. Verbs can cause other data repositories to be read (or queried). For example, an action associated with an instant messaging address may query an instant messaging system to determine if a corresponding user is online or offline. When applications are updated, for example, when a newer version of an application is installed or when an application with more advanced functionality is installed, a verb association can be changed (e.g., from an association with an existing application) such that the verb is associated with the newer or more advanced application.

Thus, in some embodiments, contact data can be viewed as being equivalent to a task. Accordingly, task execution can be more efficient, since a task can be executed as a result of a reduced number of user-entered commands. For example, double-clicking a telephone number can be more efficient than navigating a number of menu options to select a dial command.

A contact data control can have an on object user-interface that hides tasks from view until focus is shifted to the contact data control (e.g., by mousing over a field). For example, when focus transitions off of a field, the contact data control presents only the value contained in the field. However, when focus transitions onto the field, the contact data control can present options for manipulating the value contained in the field.

Figure 4A:
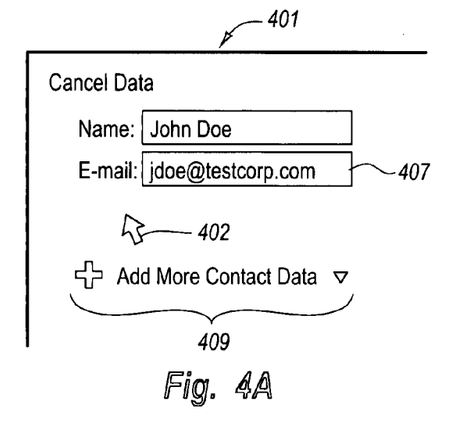
FIG. 4A illustrates a first example of a contact data control user-interface.
Figure 4B:
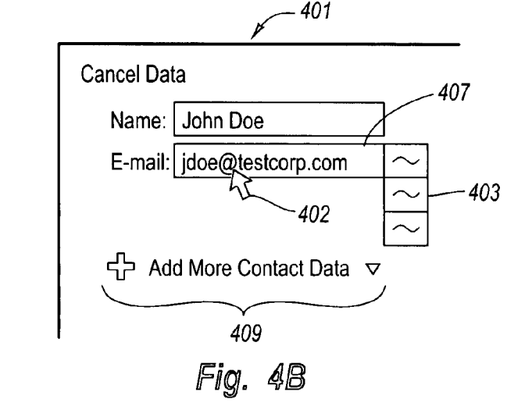
FIG. 4B illustrates a second example of a contact data control user-interface.

FIG. 4A illustrates an example of off focus display of contact information 401. That is, cursor 402 is not within any of the fields of contact information 401. On the other hand, FIG. 4B illustrates an example of on focus display of contact information 401. That is, cursor 402 is within field 407 causing options 403 to be revealed. Options 403 can include options for manipulating (e.g., editing, deleting, performing an action, etc.) the e-mail field.

Figure 4C:
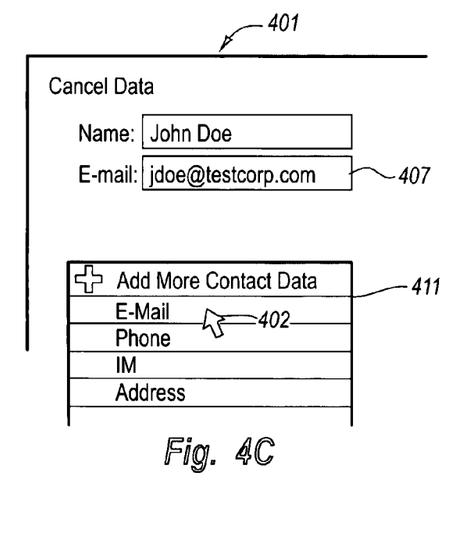
FIG. 4C illustrates a third example of a contact data control user-interface.
Figure 4D:
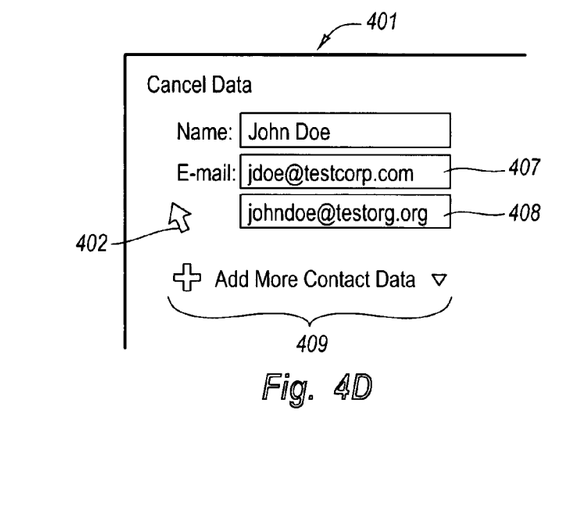
FIG. 4D illustrates a fourth example of a contact data control user-interface.

A contact data control can utilize a pop-up to edit model that facilitates entering of contact data that is subsequently automatically merged to present a simplified view mode. Selection of a pop-up option can cause an interface for entering additional contact data to be presented. FIG. 4C illustrates presentation of interface 411 in response to selection of pop-up option 409. Selection of an option within interface 411 can cause data fields to be presented. For example, selecting "E-mail" can cause an e-mail address field to be presented. An e-mail address entered into the field can be automatically merged into the contact data 401. FIG. 4D illustrates presentation of contact data 401 with a field 408 containing a merged e-mail address.

Thus, contact data controls can provide options for manipulating contact data as a result of transitioning focus to a field or as a result of selecting a pop-up option.

A contact data control can intelligently resize interfaces presenting contact data based on user-input. For example, portions of an interface can be expanded or collapsed to correspondingly present more or less contact data. Resized interfaces can include a "more" option that allows collapsed contact data in collapsed positions of an interface to be presented. A user can provide input indicating the relative importance of different portions of contact data. More important contact data can be included in expanded portions of an interface, while less important contact data is accessible through a "more" option in collapsed portions of the interface.

A contact data control can handle international formatting issues. It may be that portions of contact data are represented differently in different locations. For example, the contact data included in a postal address can vary from country to country. A contact data control can access external repositories that indicate how contact data is to be presented in different locations. For example, the contact data control can access an international address repository to determine the ordering of contact data for postal addresses in Russia.

A contact data control can allow a user to define how data is presented. Users can specify fields that are to be presented, the locations of fields on an interface, the format of contact data within a field, etc. For example, a user may specify that telephone numbers are to be presented without parenthesis around the area code. When contact data is potentially associated with more than one value, a user can specify how many values are to be presented. For example, contact data may include six fields (or more) for e-mail address values. However, a user may specify that an interface present less than six e-mail addresses (e.g., specifying that only a primary e-mail address value be presented).

It may be that a user enters presentation preferences into a presentation template that defines the user's presentation preferences. A contact data control can access the presentation template and present a contact data interface in accordance with the presentation template. In some embodiments, a user selects a presentation template from among a plurality of pre-defined presentation templates. It may be that presentation templates are dynamically updated, for example, when data in an external repository changes. For example, a template presenting a postal address in Russia can be updated when the postal address format for Russia changes.

A contact data control can check for the validity of entered contact data. That is, an interface can check with a centralized contact store to validate the format of contact data before the contact data is schematized. For example, an interface can validate that telephone number field does not contain any letters, such as, for example, A, B, or C. It may be that a contact control data validates a format corresponding to a specified location. For example, an interface can validate that a United States telephone number included 7 numbers. A contact data control can access an international format repository to determine formats for different locations.

A contact data control can set a default value for a multi-value set. That is, a contact data control can cause a value presented in a field to be a default value selected from among a plurality of possible values. For example, based on location, a contact data control may be configured to default to an area code or zip code value for that location.

A contact data control can translate user-entered contact data into schematized contact data. A contact control data can invoke a parser to parse user-entered data into appropriate data formats of a contact data schema. For example, an invoked parser can parse a user-entered string of numbers (e.g., 9998820333) into a formatted area code and local telephone number. It should be understood that a storing of numbers is merely an example of user-entered contact data that can be parsed. It would be apparent to one skilled in the art, after having reviewed this description, that a wide variety of user-entered data, in addition to strings of numbers, can be parsed.

Applications can request user-interface data from contact data controls (e.g., either a user-interface contact data control or a combined contact data control) to present retrieved contact data to a user. For example, application 103 can send user-interface request 118 to contact data control 106. In response to user-interface request 118, contact data control 106 can return user-interface data 119 to application 103. Application 103 can access user-interface data 119 to provide a user-interface for presenting retrieved contact data (e.g., contact data retrieved from schematized contact data 108). Returned user-interface data can facilitate a user-interface including any of the previous described user-interface functionality. It may be that an application requests and presents a user-interface prior to presenting retrieved contact data.

Figure 2:
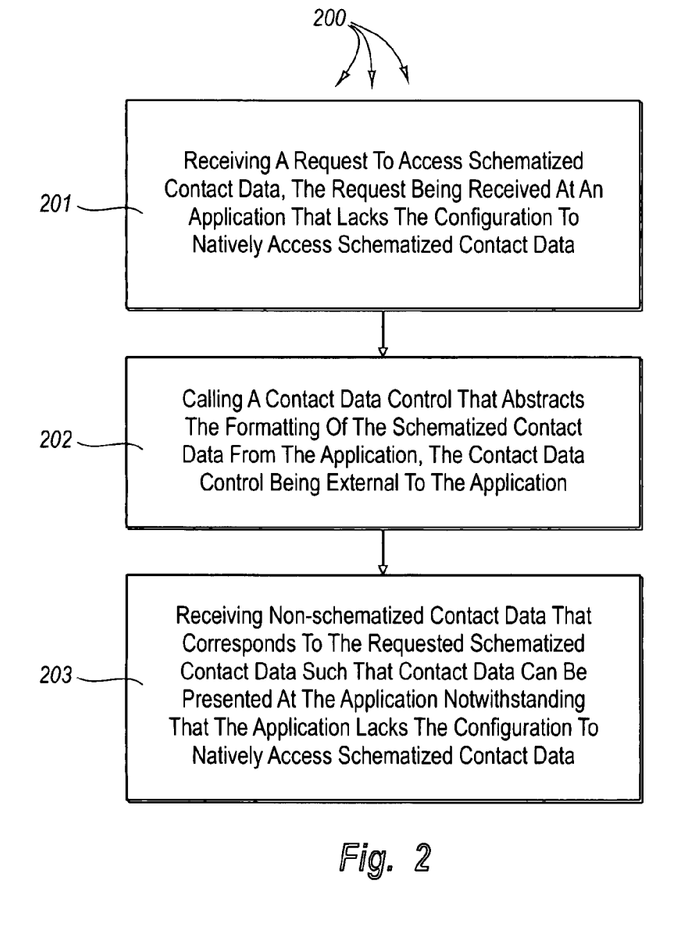
FIG. 2 illustrates an example flowchart of a method for simplifying application access to schematized contact data.

FIG. 2 illustrates an example flowchart 200 of a method for simplifying application access to schematized contact data. The method 200 will be described with reference to the modules and data in computer architecture 100. The method 200 includes an act of receiving a request to access schematized contact data, the request being received at an application that lacks the configuration to natively access the schematized contact data (act 201). For example, application 103 may be an application that lacks the configuration to natively access schematized contact data 108. Nonetheless, application 102 may receive request 112 to access schematized contact data 108. It may that a user of computing system 101 requests presentation of contact data, such as, for example, contact data 401. Accordingly, the user can manipulate an input device (e.g., a mouse or keyboard) to provide request 112 to application 103.

The method 200 includes an act of calling a contact data control that abstracts the formatting of the schematized contact data from the application, the contact data control being external to the application (act 202). For example, application 103 can call contact data control 106. As previously described, contact data control 106 can be external to application 103. Accordingly, other applications, such as, for example, applications 102 and 104 may also call contact data control 106 (e.g., either a data interface contact data control or a combined contact data control) to access schematized contact data. Contact data control 106 can include any of the previously described contact data control functionality.

In some embodiments, applications may not be authorized to directly access schematized contact data. For example, application 103 may not be authorized to directly access schematized contact data 108. Thus, the applications may request access to schematized data through an appropriate contact data control. For example, application 103 may request access to schematized data 108 through contact data control 106. Accordingly, contact data control 106 can be designed to provide access only to the portions of schematized contact data 108 that are appropriate. Designing contact data controls to have limited access to schematized contact data is particularly advantageous in managed code environments or other environments where an application's direct access to schematized contact data can more easily be controlled.

Further, contact data control 106 can abstract the formatting of schematized contact data from application 103. Thus, a designer of application 103 need not have extensive knowledge of the schema (or schemas) defining formats for schematized contact data 108. Simply knowing how to appropriately call contact control data 106 may be enough to provide (indirect) access to schematized contact data 108. As previously described, contact data control 106 can provide an API that facilitates access to contact data control 106.

Accordingly, request 112 can be forwarded onto and received at contact data control 106. In response to request 112, contact data control 106 can retrieve schematized contact data 111 from schematized contact data 108. Contact data control 106 can convert schematized contact data 111 to corresponding non-schematized contact data 109. Contact data control 106 can send non-schematized data 109 to application 103.

The method 200 includes an act of receiving non-schematized contact data that corresponds to the requested schematized contact data (act 203). For example, application 103 can receive non-schematized data 109. Accordingly, application 103 can present contact data (non-schematized contact data 109) notwithstanding that application 103 lacks the configuration to access the schematized contact data 108 directly. For example, application 103 can send presentation 114 (e.g., that includes user-interface data 119) to an output device, such as, for example, a computer monitor.

Applications can request user-interface data from contact data controls (e.g., either a user-interface contact data control or a combined contact data control) to present an interface for receiving contact data from a user. For example, application 103 can send user-interface request 118 to contact data control 106. In response to user-interface request 118, contact data control 106 can return user-interface data 119 to application 103. Application 103 can access user-interface data 119 to provide a user-interface for receiving contact data from a user. Returned user-interface data can facilitate a user-interface including any of the previously described user-interface functionality. It may be that an application requests and presents a user-interface for receiving contact data from a user prior to updating schematized contact data.

Figure 3:
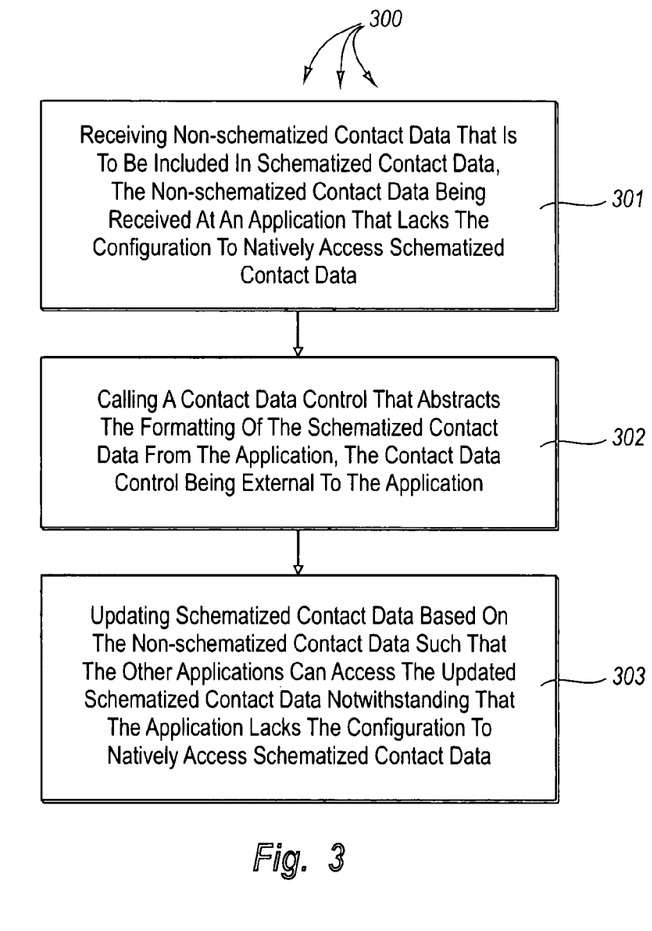
FIG. 3 illustrates an example flowchart of a method for simplifying application updates to schematized contact data.

FIG. 3 illustrates an example flowchart of a method 300 for simplifying application updates to schematized contact data. The method 300 will be described with reference to the modules and data in computer architecture 100. The method 300 includes an act of receiving non-schematized contact data that is to be included in schematized contact data (act 301). The non-schematized contact data can be received at an application that lacks the configuration to natively access schematized data. For example, application 103 can receive request 112. Request 112 can include non-schematized contact data (e.g. non-schematized data 109) entered into data fields of application 103.

The method 300 includes an act of calling a contact data control that abstracts the formatting of the schematized contact data from the application (act 302). For example, application 103 can call contact data control 106. As previously described, contact data control 106 can be external to application 103. Accordingly, other applications, such as, for example, applications 102 and 104 may also call contact data control 106 to update schematized contact data. Calling a contact data control 106 can include sending non-schematized contact data 109 to contact data control 106. Contact data control 106 can include any of the previously described contact data control functionality.

In some embodiments, applications may not be authorized to directly update schematized contact data. For example, application 103 may not be authorized to directly update schematized contact data 108. Thus, the applications may request access to schematized data through an appropriate contact data control. For example, application 103 may request an update to schematized data 108 through contact data control 106. Accordingly, contact data control 106 can be designed to update only the portions of schematized contact data 108 that are appropriate. As previously described, limiting access is particularly advantageous in managed code environments or other environments where an application's direct access to schematized contact data can more easily be controlled.

The method 300 includes an act of updating schematized contact data based on the non-schematized data (act 303). For example, contact data control 106 can receive non-schematized contact data 109. Contact data control 106 can convert non-schematized contact data 109 to corresponding schematized contact data 111. Schematized contact data 111 can conform to contact data schemas that correspond to schematized contact data 108. Contact data control 106 can store schematized contact data 111 in schematized contact data 108. Accordingly, applications that lack the configuration to natively update schematized contact data can (indirectly) update schematized contact data through contact data control 106. Storing schematized contact data 111 in schematized contact data 108 (e.g., a centralized data store) can make schematized contact data 111 accessible to other applications.

Figure 5:
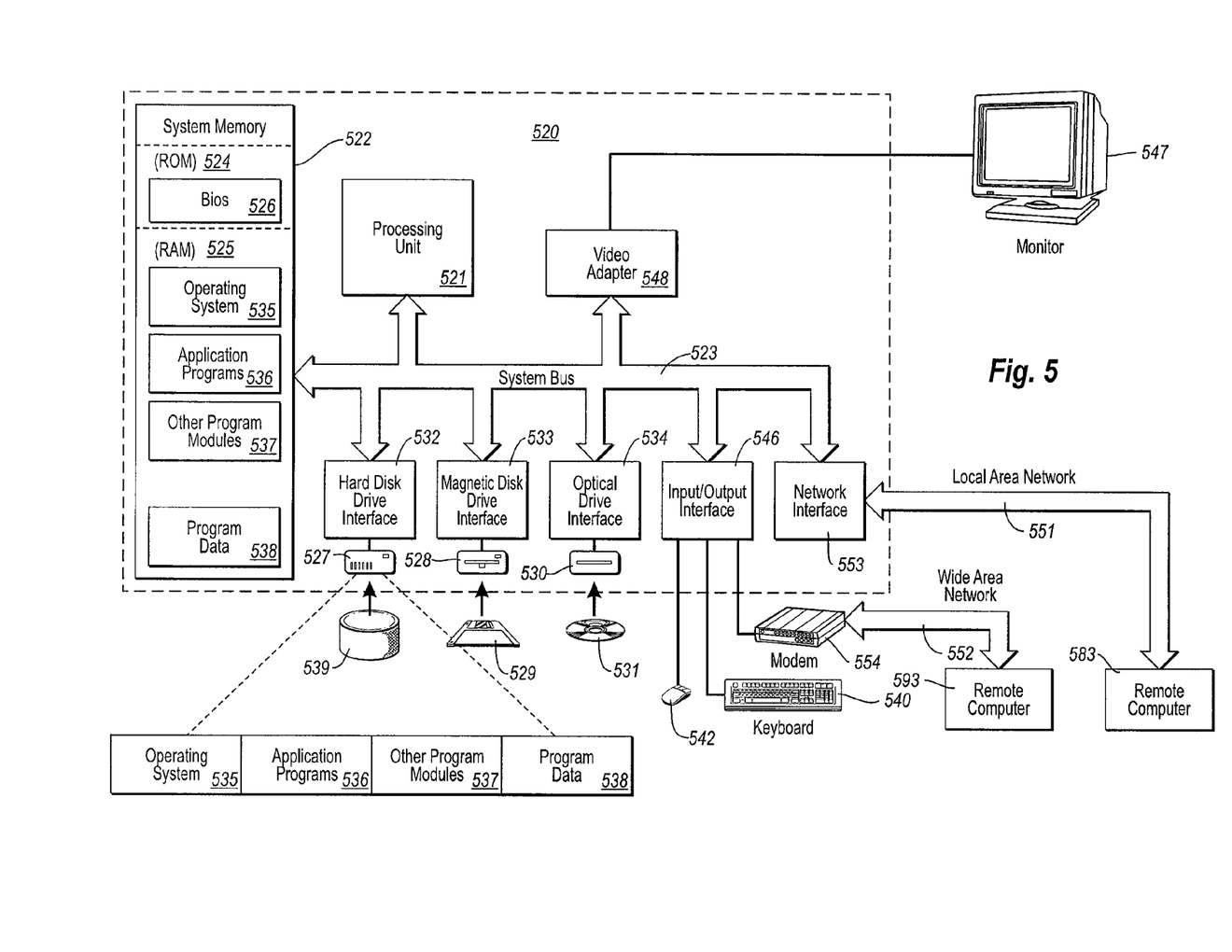
FIG. 5 illustrates a suitable operating environment for the principles of the present invention.

FIG. 5 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 5, an example system for implementing the invention includes a general-purpose computing device in the form of computer system 520, including a processing unit 521, a system memory 522, and a system bus 523 that couples various system components including the system memory 522 to the processing unit 521. Processing unit 521 can execute computer-executable instructions designed to implement features of computer system 520, including features of the present invention. The system bus 523 may be any of several types of bus structures including a memory bus or memory controller, a peripheral bus, and a local bus using any of a variety of bus architectures. The system memory includes read only memory ("ROM") 524 and random access memory ("RAM") 525. A basic input/output system ("BIOS") 526, containing the basic routines that help transfer information between elements within computer system 520, such as during start-up, may be stored in ROM 524.

The computer system 520 may also include magnetic hard disk drive 527 for reading from and writing to magnetic hard disk 539, magnetic disk drive 528 for reading from or writing to removable magnetic disk 529, and optical disk drive 330 for reading from or writing to removable optical disk 531, such as, or example, a CD-ROM or other optical media. The magnetic hard disk drive 527, magnetic disk drive 528, and optical disk drive 530 are connected to the system bus 523 by hard disk drive interface 532, magnetic disk drive-interface 533, and optical drive interface 534, respectively. The drives and their associated computer-readable media provide non-volatile storage of computer-executable instructions, data structures, program modules, and other data for the computer system 520. Although the example environment described herein employs magnetic hard disk 539, removable magnetic disk 529 and removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 539, magnetic disk 529, optical disk 531, ROM 524 or RAM 525, including an operating system 535, one or more application programs 536, other program modules 537, and program data 538. A user may enter commands and information into computer system 520 through keyboard 540, pointing device 542, or other input devices (not shown), such as, for example, a microphone, joy stick, game pad, scanner, or the like. These and other input devices can be connected to the processing unit 521 through input/output interface 546 coupled to system bus 523. Input/output interface 546 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 547 or other display device is also connected to system bus 523 via video interface 548. Monitor 547 can display graphical objects, including text, generated by computer system 520. Other peripheral devices (not shown), such as, for example, speakers, printers, and scanners, can also be connected to computer system 520. Printers connected to computer system 520 can print graphical objects, including text, generated by computer system 520.

Computer system 520 is connectable to networks, such as, for example, an office-wide or enterprise-wide computer network, a home network, an intranet, and/or the Internet. Computer system 520 can exchange data with external sources, such as, for example, remote computer systems, remote applications, and/or remote databases over such networks.

Computer system 520 includes network interface 553, through which computer system 520 receives data from external sources and/or transmits data to external sources. As depicted in FIG. 5, network interface 553 facilitates the exchange of data with remote computer system 583 via link 551. Network interface 553 can logically represent one or more software and/or hardware modules, such as, for example, a network interface card and corresponding Network Driver Interface Specification ("NDIS") stack. Link 551 represents a portion of a network (e.g., an Ethernet segment), and remote computer system 583 represents a node of the network.

Likewise, computer system 520 includes input/output interface 546, through which computer system 520 receives data from external sources and/or transmits data to external sources. Input/output interface 546 is coupled to modem 554 (e.g., a standard modem, a cable modem, or digital subscriber line ("DSL") modem), through which computer system 520 receives data from and/or transmits data to external sources. As depicted in FIG. 5, input/output interface 546 and modem 554 facilitate the exchange of data with remote computer system 593 via link 552. Link 552 represents a portion of a network and remote computer system 593 represents a node of the network.

While FIG. 5 represents a suitable operating environment for the present invention, the principles of the present invention may be employed in any system that is capable of, with suitable modification if necessary, implementing the principles of the present invention. The environment illustrated in FIG. 5 is illustrative only and by no means represents even a small portion of the wide variety of environments in which the principles of the present invention may be implemented.

In accordance with the present invention, applications and contact data controls, such as, for example, applications 102-104 and contact data controls 106 and 107, as well as associated program data, such as, for example, non-schematized contact data 109, schematized contact data 111, and schematized contact data 108, can be stored and accessed from any of the computer-readable media associated with computer system 520. For example, portions of such modules and portions of associated program data may be included in operating system 535, application programs 536, program modules 537 and/or program data 538, for storage in system memory 522.

When a mass storage device, such as, for example, magnetic hard disk 539, is coupled to computer system 520, such modules and associated program data may also be stored in the mass storage device. In a networked environment, program modules depicted relative to computer system 520, or portions thereof, can be stored in remote memory storage devices, such as, system memory and/or mass storage devices associated with remote computer system 583 and/or remote computer system 593. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims

What is claimed and desired secured by United States Letters Patent is:

1. In a computing system that has access to contact data stored according to a schema in a data store, the data store being in communication with applications configured to request access to schematized contact data in the data store, one or more of the applications lacking the configuration to natively access the schematized contact data, a method for simplifying access to the schematized contact data, the method comprising:

an application calling a contact data control to request a first user interface, the contact data control being external to the application;

the application receiving the first user interface from the external contact data control and displaying the first user interface;

the application receiving at the first user interface a request to access contact data stored in a data store, wherein the data store is centralized and acting as a single data store for contact data for a plurality of applications accessing contact data, and wherein the centralized data store stores all contact data for the plurality of applications according to a single schema for which the application receiving the request lacks the configuration to natively access;

the application calling the external contact data control to request the contact data in a non-schematized format, wherein the application calling the external contact data control includes the application requesting that the external contact data control retrieve the contact data and translate the contact data from a schematized format to the non-schematized format, and further requesting that the external contact data provide the application with authorization to access the schematized contact data, wherein the application natively lacks both the configuration and authorization to access the schematized contact data;

the application receiving the requested contact data from the external contact data control in the non-schematized format, the contact data received by the application having been converted from a corresponding schematized format by the external data contact control;

the application calling the external contact data control to request a second user interface; and the application receiving the second user interface from the external contact data control and causing a display device to display the contact data at the second user interface to a user of the application, the displayed contact data corresponding to the contact data received by the application in a non-schematized format and converted by the external contact data control from the schematized format, and the contact data being displayed notwithstanding that the application lacks the configuration to natively access the contact data stored in the data store according to the schema.

2. The method as recited in claim 1, wherein the act of the application calling an external contact data control comprises an act of calling a contact data control that prevents empty data fields from being presented.

3. The method as recited in claim 1, wherein the act of the application calling an external contact data control comprises an act of calling a contact data control that offers an actionable user-interface.

4. The method as recited in claim 3, further comprising:
selecting a portion of displayed contact data from the actionable user-interface to cause an action associated with an updated application to be performed.

5. The method as recited in claim 1, wherein the act of the application calling an external contact data control comprises an act of calling an external contact data control that presents tasks associated with a data field when focus is shifted to the data field.

6. The method as recited in claim 1, wherein the act of the application calling an external contact data control comprises an act of calling an external contact data control that provides a pop-up menu to manipulate contact data.

7. The method as recited in claim 1, wherein the act of the application calling an external contact data control comprises an act of calling an external contact data control that determines the size of an interface based on the user-input.

8. The method as recited in claim 1, wherein the act of the application calling an external contact data control comprises an act of calling an external contact data control that appropriately presents contact data based on a location associated with the contact data.

9. The method as recited in claim 1, wherein the act of the application calling an external contact data control comprises an act of calling an external contact data control that determines the contact data to be displayed based on user-input.

10. The method as recited in claim 9, wherein the act of calling a contact data control that determines the contact data to be displayed based on user-input comprises an act of determining the contact data to be displayed based on a presentation template.

11. The method as recited in claim 9, wherein the act of calling a contact data control that determines the contact data to be displayed based on user-input comprises an act of determining the contact data to be displayed based on a dynamically updated presentation template.

12. The method as recited in claim 9 wherein the act of the application calling an external contact data control that determines the contact data to be displayed based on user-input comprises an act calling an external contact data control that sets a default value for a multi-value set.

13. A method as recited in claim 1, further comprising:
receiving user selection of a limited portion of the displayed contact data, and the application automatically initiating communication with the contact by the mere selection of the limited portion of the contact data.

14. A method as recited in claim 1, wherein the single data store stores contact information for a plurality of contacts, and wherein each contact has a single set of contact data merged from a plurality of applications and stored in the schematized format.

15. In a computing system that has access to contact data that is stored in a centralized data store according to a single schematized format for multiple applications, the data store being in communication with applications configured to request access to schematized contact data, one or more of the applications lacking the configuration to natively access schematized contact data in the data store, a method for simplifying access to the schematized contact data, the method comprising:

receiving contact data for one or more contacts, the contact data being received by an application that lacks the configuration to natively access contact data of a schematized format, the application calling a contact data control to request a first user interface, the contact data control being external to the application;

the application receiving the first user interface from the external contact data control and causing a display device to display to a user of the application at the first user interface at least a portion of the contact data for the one or more contacts;

the application calling the external contact data control to request a second user interface and displaying the second user interface;

the application receiving, at the second user interface, updates to the contact data for the one or more contacts;

the application calling the external contact data control, wherein calling the external contact data control includes the application sending the updates to the contact data to the external contact data control in a non-schematized format and requesting that the external contact data control translate the contact data from the non-schematized format to a schematized format and update the contact data for the one or more contacts in a centralized data store to reflect the updates to the contact data, the centralized data store acting as a single data store for contact data for the application and one or more other applications that access the contact data, the centralized data store storing the contact information in the schematized format, and the updated contact data in the data store being stored in the schematized format such that the one or more other applications can access the updated contact data in the schematized format; and wherein the application calling the external contact data control further includes the application requesting that the external contact data control provide the application with access to update the contact data in the schematized format, wherein the application natively lacks both the configuration and authorization to access the schematized contact data; and using the application or the one or more other applications, accessing the updated contact data from the centralized data store, and displaying the updated contact data to a user of the respective application.

16. The method as recited in claim 15, wherein the act of calling the application an external contact data control comprises an act of calling an external contact data control that checks the validity of the contact data received by the application in a non-schematized format.

17. A method as recited in claim 15, further comprising:
the external contact data control determining that the accessed contact data includes international contact information relative to the user; and
the external contact data control determining how the international contact data is to be formatted for an international location and re-ordering the contact data according to a suitable format for the international location.

18. A method as recited in claim 17, wherein the external contact data control accesses an external repository to determine a standard formatting for the international location.

19. A method as recited in claim 17, wherein the external contact data control accesses a presentation template for displaying contact data according to the suitable formatting for the international location.

20. A method as recited in claim 19, wherein the presentation template is defined by the user's presentation preferences.

21. A computing system, comprising:
one or more processors; and
one or more computer-readable storage media, having stored thereon:
a centralized data store acting as a single data store of contact data for a plurality of applications which access the contact data, wherein the centralized data store stores all contact data for the plurality of applications and according to a single schema not natively understood by one or more of the plurality of applications, one or more of the plurality of applications that are not configured to natively access the schematized contact data and which are not authorized to access the schematized contact data, and at least one external contact data control that can be executed by the one or more processors, the at least one external contact data control being configured to:
receive a request from an application that lacks the configuration to natively access the contact data stored at the centralized data store in the schematized format, the request including a request to retrieve the contact data, to translate the contact data from the schematized format to the non-schematized format, and to provide the application with authorization to access the schematized contact data;
provide the application with a user-interface that can receive requests, updates, and data from the user;
provide the application with a user-interface that can display data to the user;
retrieve contact data from the centralized data store and in the schematized format in response to the request;
convert retrieved contact data from the schematized format to a corresponding non-schematized format such that the application can present contact data to a user notwithstanding that the application lacks the configuration to access contact data directly in the schematized format; and
send the contact data in the non-schematized format to the application to be presented to a user.

22. A computing system, comprising:
one or more processors; and
one or more computer-readable storage media, having stored thereon:
a centralized data store acting as a single data store of contact data for a plurality of applications which access the contact data, wherein the centralized data store stores all contact data for the plurality of applications and according to a single schema not natively understood by one or more of the plurality of applications, one or more of the plurality of applications lacking the configuration to natively access the schematized contact data and which are not authorized to access the schematized contact data, and at least one external contact data control that can be executed by the one or more processors, the at least external one contact data control being configured to:
receive a request from an application to access contact data for one or more contacts, the contact data being stored in the centralized data store in a schematized format, and the application making the request notwithstanding the application lacking the configuration to natively access contact data in the schematized format, the request further including a request to translate convert the contact data from the schematized format to a non-schematized format, and a request to provide the application with authorization to access the schematized contact data;

provide the application with a user-interface that can receive requests, updates, and data from the user;

provide the application with a user-interface that can display data to the user;

retrieve contact data from the centralized data store corresponding to the request from the application, the retrieved contact data being in the schematized format;

manage access of the application to the retrieved contact data for the one or more contacts, wherein managing access includes granting the application access to only limited portions of contact data for one or more contacts;

convert the limited portions of the contact data in the schematized format to the non-schematized format;

determine that some fields in the limited portions of the contact data have a null value;

suppress the fields having a null value and provide the remaining fields of the contact data to the application in the non-schematized format;

receive updated contact data in the non-schematized format from the application;

convert the updated contact data from the non-schematized format to a corresponding schematized format that conforms with the contact data schema of the centralized data source, thereby allowing the application to update contact data in the schematized format notwithstanding that the application lacks the configuration to natively access the contact data stored in the schematized format; and store corresponding contact data in the centralized data store and in the schematized format such that other applications can access the stored contact data in accordance with the contact data schema.

23. The system as recited in claim 22, wherein the external contact data control is configured to convert the contact data from the non-schematized format to a corresponding schematized format by calling a parser that parses the contact data of the non-schematized format such that the non-schematized contact data can be made to conform with the contact data schema.

24. The system as recited in claim 22, wherein the external contact data control is configured to convert the contact data from the non-schematized format to a corresponding schematized format by checking the validity of received contact data of the non-schematized format.

* * * * *